(12) United States Patent
Kazmaier et al.

(10) Patent No.: US 12,512,563 B2
(45) Date of Patent: Dec. 30, 2025

(54) MODULE CONNECTOR AND METHOD FOR ELECTRICALLY CONDUCTIVELY CONNECTING A MODULE CONNECTOR TO A BATTERY MODULE

(71) Applicant: ELRINGKLINGER AG, Dettingen (DE)

(72) Inventors: Stefan Kazmaier, Kirchheim unter Teck (DE); Michael Schweizer, Bad Urach (DE); Holger Mann, Weil im Schönbuch (DE)

(73) Assignee: ELRINGKLINGER AG, Dettingen (DE)

( * ) Notice: Subject to any disclaimer, the term of this patent is extended or adjusted under 35 U.S.C. 154(b) by 657 days.

(21) Appl. No.: 17/941,922

(22) Filed: Sep. 9, 2022

(65) Prior Publication Data

US 2023/0006309 A1 Jan. 5, 2023

Related U.S. Application Data (63) Continuation of application No. PCT/EP2021/056261, filed on Mar. 11, 2021.

(30) Foreign Application Priority Data

Mar. 17, 2020 (DE) ...................... 10 2020 107 323.2

(51) Int. Cl.
*H01M 50/517* (2021.01)
*H01M 50/204* (2021.01)
(Continued)

(52) U.S. Cl.
CPC ....... *H01M 50/517* (2021.01); *H01M 50/204* (2021.01); *H01M 50/503* (2021.01);
(Continued)

(58) Field of Classification Search
CPC ............. H01M 50/517; H01M 50/204; H01M 50/503; H01M 50/505; H01M 50/502; H01R 4/301; H01R 11/26; Y02E 60/10
See application file for complete search history.

(56) References Cited

U.S. PATENT DOCUMENTS

| 10,381,752 B2 * | 8/2019 | Kaehny ................... H01R 11/11 |
| 2008/0113262 A1 * | 5/2008 | Phillips ............... H01M 10/482 429/149 |

(Continued)

FOREIGN PATENT DOCUMENTS

| DE | 3518216 | 11/1986 |
| DE | 102014017143 | 5/2016 |

(Continued)

OTHER PUBLICATIONS

German Patent Office, "Search Report," issued in connection with German Patent Application No. 102020107323.2, dated Nov. 13, 2020, 18 pages, with English translation.

International Search Authority, "International Search Report and Written Opinion," issued in connection with International Patent Application No. PCT/EP2021/056261, dated Sep. 23, 2021, 14 pages, with English translation.

(Continued)

*Primary Examiner* — Briggitte R. Hammond
(74) *Attorney, Agent, or Firm* — Hanley, Flight & Zimmerman, LLC (57) ABSTRACT

In order to create a module connector for electrically conductively connecting at least two battery modules, comprising a connecting conductor, which has a contact region that is arrangeable on a contact element of a battery module, in which module connector a sufficient contact protection for a fastening element is ensured in a simple and reliable manner, it is proposed that the module connector comprises a contact protection element, which at least partially covers the contact region of the connecting conductor, and a fastening element for fixing the contact region of the connecting conductor to the contact element, wherein the fastening element in a rest position is held on the contact protection (Continued)

element and is transferable from the rest position into an assembly position in which a contact protection is provided for at least a protected part of the fastening element by the contact protection element.

18 Claims, 8 Drawing Sheets

(51) Int. Cl.
*H01M 50/503* (2021.01)
*H01M 50/505* (2021.01)
*H01R 4/30* (2006.01)
*H01R 11/26* (2006.01)

(52) U.S. Cl.
CPC .......... *H01M 50/505* (2021.01); *H01R 4/301* (2013.01); *H01R 11/26* (2013.01)

(56) References Cited

U.S. PATENT DOCUMENTS

| | | |
|---|---|---|
| 2018/0331344 A1 | 11/2018 | Acikgoez et al. |
| 2018/0375227 A1 | 12/2018 | Kaehny et al. |
| 2020/0067211 A1 | 2/2020 | Yamanaka |

FOREIGN PATENT DOCUMENTS

| | | |
|---|---|---|
| DE | 102016206846 | 10/2017 |
| DE | 202018100111 | 9/2018 |

OTHER PUBLICATIONS

International Search Authority, "International Preliminary Report on Patentability," issued in connection with PCT international application No. PCT/EP2021/056261, dated Sep. 29, 2022, 13 pages, with English translation.

\* cited by examiner

MODULE CONNECTOR AND METHOD FOR ELECTRICALLY CONDUCTIVELY CONNECTING A MODULE CONNECTOR TO A BATTERY MODULE

RELATED APPLICATIONS

This application is a continuation of international application number PCT/EP2021/056261 filed on 11 Mar. 2021 and claims the benefit of German application number 10 2020 107 323.2 filed on 17 Mar. 2020.

The present disclosure relates to the subject matter disclosed in international application number PCT/EP2021/056261 of 11 Mar. 2021 and German application number 10 2020 107 323.2 of 17 Mar. 2020, which are incorporated herein by reference in their entirety and for all purposes.

FIELD OF THE DISCLOSURE

The present invention relates to a module connector for electrically conductively connecting at least two battery modules, wherein the module connector comprises a connecting conductor, which has a contact region that is arrangeable on a contact element of a battery module.

Such module connectors are used in an electrical battery storage that comprises a plurality of battery modules to connect the battery modules of the battery storage to one another in an electrically conductive manner.

When assembling the module connectors on the battery modules to be connected to one another, it must be ensured that there is no risk of an electric shock during and/or after the assembly.

To prevent this, it is known, for example, to use a fastening screw, which has a screw head provided with an electrically insulating coating, as a fastening element for assembling the module connector on the contact element of the battery module.

The production of such an electrically insulating coating is complex, however, and such an electrically insulating coating can be easily damaged before or during the assembly, the contact protection provided by the electrically insulating coating then being lost.

SUMMARY OF THE INVENTION

In accordance with an embodiment of the invention, a module connector of the kind stated at the outset is created in which a sufficient contact protection for a fastening element is ensured in a simple and reliable manner.

In accordance with an embodiment of the invention, a module connector with the features of the preamble of claim 1 is created in which the module connector comprises a contact protection element, which at least partially covers the contact region of the connecting conductor, and a fastening element for fixing the contact region of the connecting conductor to the contact element, wherein the fastening element in a rest position is held on the contact protection element and is transferable from the rest position into an assembly position in which a contact protection is provided for at least a protected part of the fastening element by the contact protection element.

In the case of the module connector in accordance with the invention, the fastening element is already connected to the contact protection element before the assembly of the module connector on a battery module, such that no additional connecting elements have to be used in the assembly of the module connector on the battery module. The assembly of the module connector on the battery module is hereby simplified and the assembly time shortened.

In a preferred embodiment of the invention, provision is made that the fastening element has a head and a shank and the protected part of the fastening element comprises the head of the fastening element.

Provision is preferably made that the fastening element in the rest position and/or in the assembly position is captively held on the contact protection element. This enables a simple handleability of the module connector upon assembly on a battery module or upon disassembly of the module connector from the battery module in the case of a repair or maintenance.

The contact protection element may comprise a blocking element, which blocks a transfer of the fastening element from the rest position into the assembly position. Provision may hereby be made that the blockade of the fastening element can be overcome by the fastening element being acted upon with an activating force that is sufficiently high in order to destroy the blocking element or to deform same such that the fastening element can be moved past the blocking element.

Furthermore, provision may be made that the contact protection element comprises a retaining element, which prevents a removal of the fastening element from the contact protection element in the rest position of the fastening element. The contact protection element and the fastening element can thus be handled as a unit in a simple manner.

In a preferred embodiment of the invention, provision is made that the fastening element comprises a holding region, which in the rest position of the fastening element is held between the blocking element and the retaining element, particularly preferably substantially without play.

Here, the holding region may, in particular, comprise part of the head of the fastening element.

Furthermore, provision may be made that the fastening element has an engagement region with which an assembly tool, for example a screwdriver or a key, can be brought into engagement in order to move the fastening element out of the rest position by acting upon it with an activating force.

Such an engagement region may, in particular, have an engagement recess that has, for example, a polygonal cross section.

In particular, provision may be made that the engagement region is formed complementary to an Allen key or complementary to a Torx key.

The blocking element may comprise, in particular, at least one rib.

Such a rib may run substantially perpendicularly to a longitudinal axis of the fastening element.

Alternatively, provision may also be made that such a rib runs substantially in parallel to a longitudinal axis of the fastening element.

The contact protection element may comprise an inlet channel for accommodating a portion of the connecting conductor.

The contact protection element may be captively held on the connecting conductor, preferably by interference fit.

The connecting conductor may comprise an insulating sleeve, and the inlet channel may have a constriction, wherein provision is preferably made that the insulating sleeve of the connecting conductor ends in the region of the constriction of the inlet channel.

A longitudinal axis of the inlet channel may run obliquely to a longitudinal axis of the fastening element when the fastening element is arranged in its rest position on the contact protection element.

The angle that the longitudinal axis of the inlet channel encloses with the longitudinal axis of the fastening element may preferably be at least 10°, in particular at least 20°, particularly preferably at least 30°.

Furthermore, the angle that the longitudinal axis of the inlet channel encloses with the longitudinal axis of the fastening element may preferably be at most 80°, in particular at most 70°, particularly preferably at most 60°.

In a preferred embodiment of the invention, provision is made that the contact protection element has a through-recess through which a part of an assembly tool can extend from an outside space of the contact protection element into an inside space of the contact protection element.

Such an assembly tool may serve, in particular, to rotate the fastening element about its longitudinal axis in order to, for example, bring the fastening element into engagement with a thread that is arranged on the contact element of the battery module.

The contact protection element may comprise an electrically insulating plastic material and, in particular, be made substantially entirely of such an electrically insulating plastic material.

The contact protection element may be configured as an injection molded part. The contact protection element is preferably formed in one piece. The connecting conductor may comprise a flat conductor.

In particular, provision may be made that the contact region of the connecting conductor is configured as a flat conductor.

The contact region of the connecting conductor preferably has a through-opening through which the fastening element of the module connector extends in the assembly position.

The connecting conductor may comprise an electrically conductive conductor body, which is configured as a flat conductor, preferably as a flat wire.

The conductor body may be provided, at least in sections, with an electrically insulating sleeve, for example made of a plastic material.

Furthermore, the connecting conductor may be made, for example, of a round wire provided with an insulating sleeve, at least one end region of the connecting conductor being reshaped to form a contact region that can be fixed to a contact element of the battery module.

To reduce the mechanical forces occurring in the connecting conductor, in particular the mechanical forces due to position tolerances of the battery modules to be connected to one another by the connecting conductor, provision may be made that the connecting conductor has at least one bend, preferably at least two bends. Such position tolerances can occur upon assembly of the battery modules due to a swelling of the cells of the battery modules as a result of an aging process or during the operation of the battery modules due to different thermal expansions.

The at least one bend of the connecting conductor preferably has a bend angle of at least 90°.

The sum of the bend angles of the bends of the connecting conductor is preferably at least 180°.

The electrically conducting conductor body of the connecting conductor is preferably made of an electrically conductive metallic material.

For example, provision may be made that the conductor body of the connecting conductor is made of a CCA (copper clad aluminum) or of a different material containing primarily aluminum.

The use of aluminum offers the advantage that aluminum has a lower density than copper, such that a conductor body that is made primarily of aluminum is lighter than a conductor body made of copper ever when taking into account the lower electrical conductivity of aluminum with the same current-carrying capacity.

The use of copper offers the advantage that a conductor body made primarily of copper has a lower contact resistance to a contact element of the battery module made of copper.

The connecting conductor configured, at least in sections, as round wire is preferably brought by means of a wire bending machine into the form required for the connection of the battery modules to be connected to one another.

The end regions of the connecting conductor on which the connecting conductor is to be connected to a respective contact element of a battery module are free from the insulating sleeve (stripped).

In a preferred embodiment of the invention, provision is made that the contact region of the connecting conductor is formed from the starting material of the connecting conductor by means of a reshaping operation, for example by means of a drop forging operation.

During the reshaping operation, in particular, a through-opening for the fastening element of the module connector can be formed from the starting material of the connecting conductor.

In principle, the portion of the connecting conductor configured as insulated round wire may also be made of cable strands.

In this case, however, the cable strands would have to be materially bonded, for example by welding or soldering, to the contact region of the connecting conductor in an electrically conductive manner.

In contrast, a contact region of the connecting conductor that is produced in one piece from the conductor body of the connecting conductor offers the advantage that the production of a joint between the conductor body of the connecting conductor on the one hand and the contact region of the connecting conductor on the other hand can be forgone, which simplifies the production of the module connector and increases the reliability of the electrical connection by the module connector.

If the connecting conductor is provided with an electrically insulating sleeve, this thus advantageously enables the use of the module connector in environments in which an electrical insulation strength and/or a contact protection is required.

The connecting conductor is preferably provided on at least two different regions of the connecting conductor, in particular on at least two end regions of the connecting conductor, with a respective contact region for electrically conductively connecting to a contact element of a battery module.

The contact region of the connecting conductor can be latched to the contact protection element.

The present invention further relates to a method for electrically conductively connecting a module connector to a contact element of a battery module.

In accordance with an embodiment of the invention, such a method is provided by means of which a sufficient contact protection for a fastening element of the module connector in the assembly position on the contact element of the battery module is provided in a simple and reliable manner.

In accordance with an embodiment of the invention, provision is made that the module connector comprises a connecting conductor, a contact protection element, and a fastening element and that the method comprises the following:

positioning a contact region of the connecting conductor on which the contact protection element is arranged on the contact element of the battery module;

transferring the fastening element held in a rest position on the contact protection element from the rest position into an assembly position in which the fastening element is in engagement with the contact element of the battery module and a contact protection is provided at least for a protected part of the fastening element.

The method in accordance with the invention is suited, in particular, for electrically conductively connecting the module connector in accordance with the invention to a contact element of a battery module.

Particular embodiments of the method in accordance with the invention have already been described above in conjunction with particular embodiments of the module connector in accordance with the invention.

In the module connector in accordance with the invention, a contact protection is provided over a sufficient distance, in particular a sufficiently large air gap, between a component that is under voltage in the operation of the battery module and a body part, for example a finger, of an operator.

In particular, a so-called standard finger can be used to verify the contact protection.

The fastening element of the module connector may be configured, in particular, as a fastening screw.

Such a fastening screw may be held in the rest position by means of one or more ribs that are arranged on the contact protection element.

The rib or the ribs of the contact protection element may engage, in particular, on a screw held of the fastening screw.

A screw shank of the fastening screw can be guided at a through-opening, in particular a through-bore, of the contact region of the connecting conductor of the module connector.

During the assembly of the module connector on the contact element of the battery module, the fastening screw that is held in the rest position on the contact protection element can be moved past the rib or the ribs or be pushed through the rib or the ribs with an assembly tool.

The screw-in length of the fastening screw is hereby released for a screw connection with a complementary thread on the battery module.

As soon as the fastening screw is completely screwed into the complementary thread of the battery module, when the contact protection element contacts a finger or another part of a hand of an operator, there is no risk of electrical shock, neither by contacting a component that is under voltage nor across an air gap or creepage distance.

The fastening element thereby remains accessible for an engagement with an assembly tool at all times, such that, in particular, a simple disassembly of the module connector from the battery module is possible.

The module connector in accordance with the invention is preferably fastened to the battery module by means of a screw connection.

The module connector in accordance with the invention is suited for use in a battery storage that comprises a plurality of battery modules.

Such a battery storage may be used, in particular, as an energy source for an electrically operated vehicle.

Further features and advantages of the invention are the subject matter of the subsequent description and the illustrative depiction of an exemplary embodiment.

BRIEF DESCRIPTION OF THE DRAWINGS

The same or functionally equivalent elements are provided with the same reference numerals in all Figures.

DETAILED DESCRIPTION OF THE INVENTION

Figure 2:
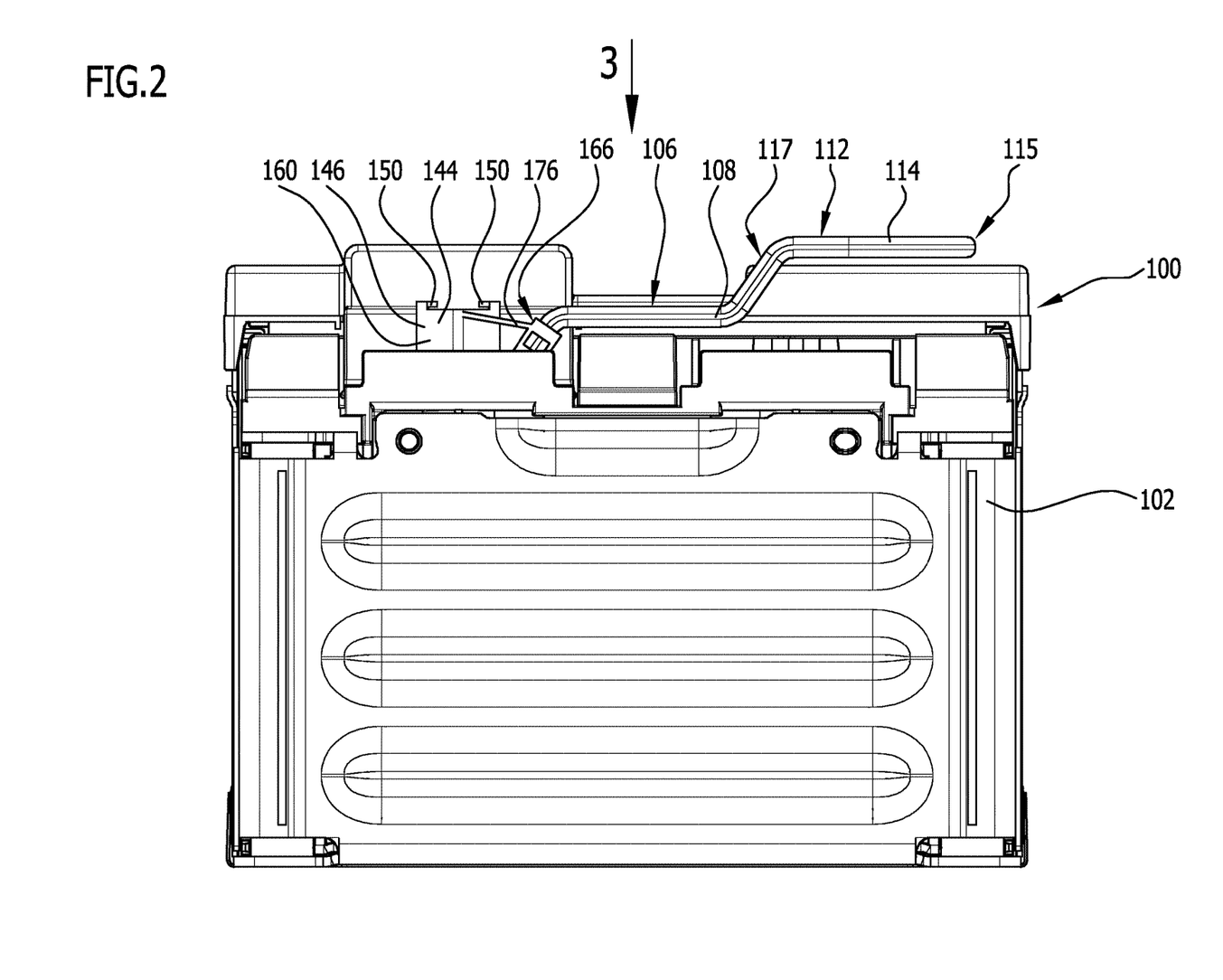
FIG. 2 shows a side view of the battery module and the module connector from FIG. 1.
Figure 3:
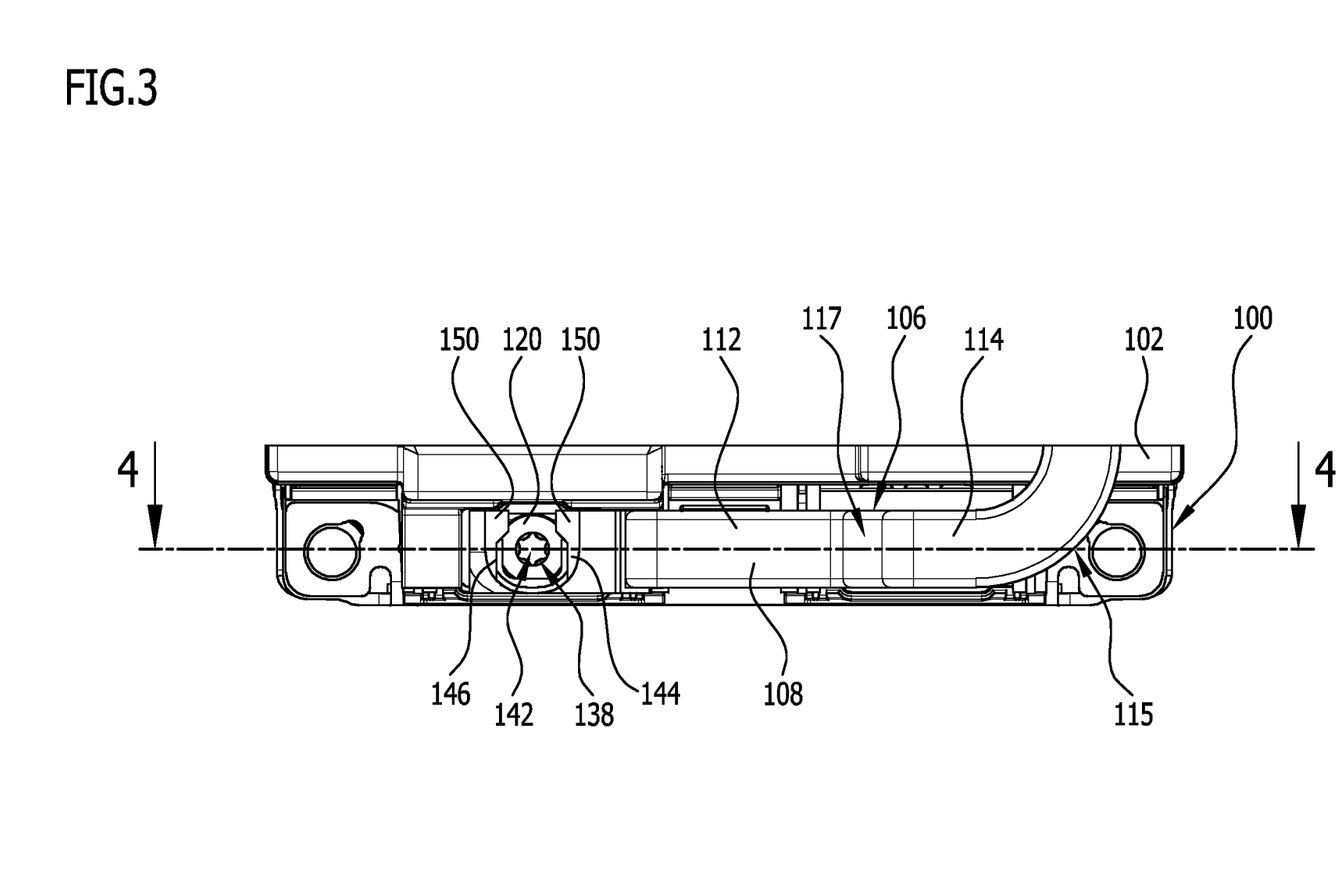
FIG. 3 shows a plan view of the battery module and the module connector from FIGS. 1 and 2, with the viewing direction in the direction of arrow 3 in FIG. 2.
Figure 4:
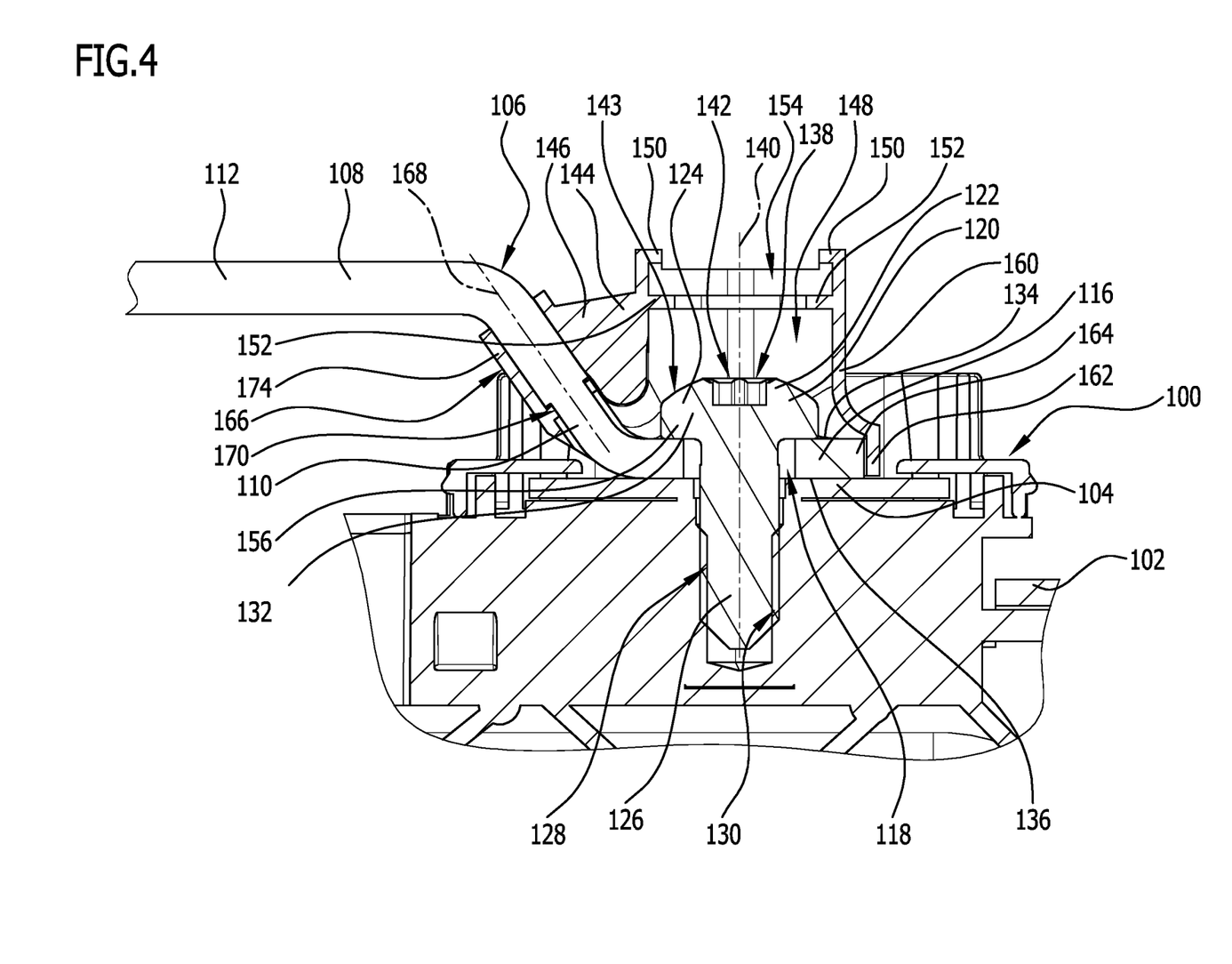
FIG. 4 shows a sectional longitudinal cut through the battery module and the module connector from FIGS. 1 to 3 along line 4-4 in FIG. 3.

A battery module 100 depicted sectionally in FIGS. 1 to 4 comprises a housing 102 in which a plurality of electrochemical cells (not depicted) are arranged, and a contact element 104 depicted in section in FIG. 4, which is electrically conductively connected to a series circuit or a parallel circuit of the electrochemical cells of the battery module 100.

The contact element 104 is in electrically conductive contact with a module connector 106, which serves to electrically conductively connect the battery module 100 to a further battery module (not depicted) or to a source of electrical energy or to a consumer of electrical energy.

The module connector 106 comprises a connecting conductor 108, which in turn comprises an electrically conductive conductor body 110 that is surrounded by an electrically insulating sleeve 114 in a connecting portion 112 of the connecting conductor 108.

Figure 1:
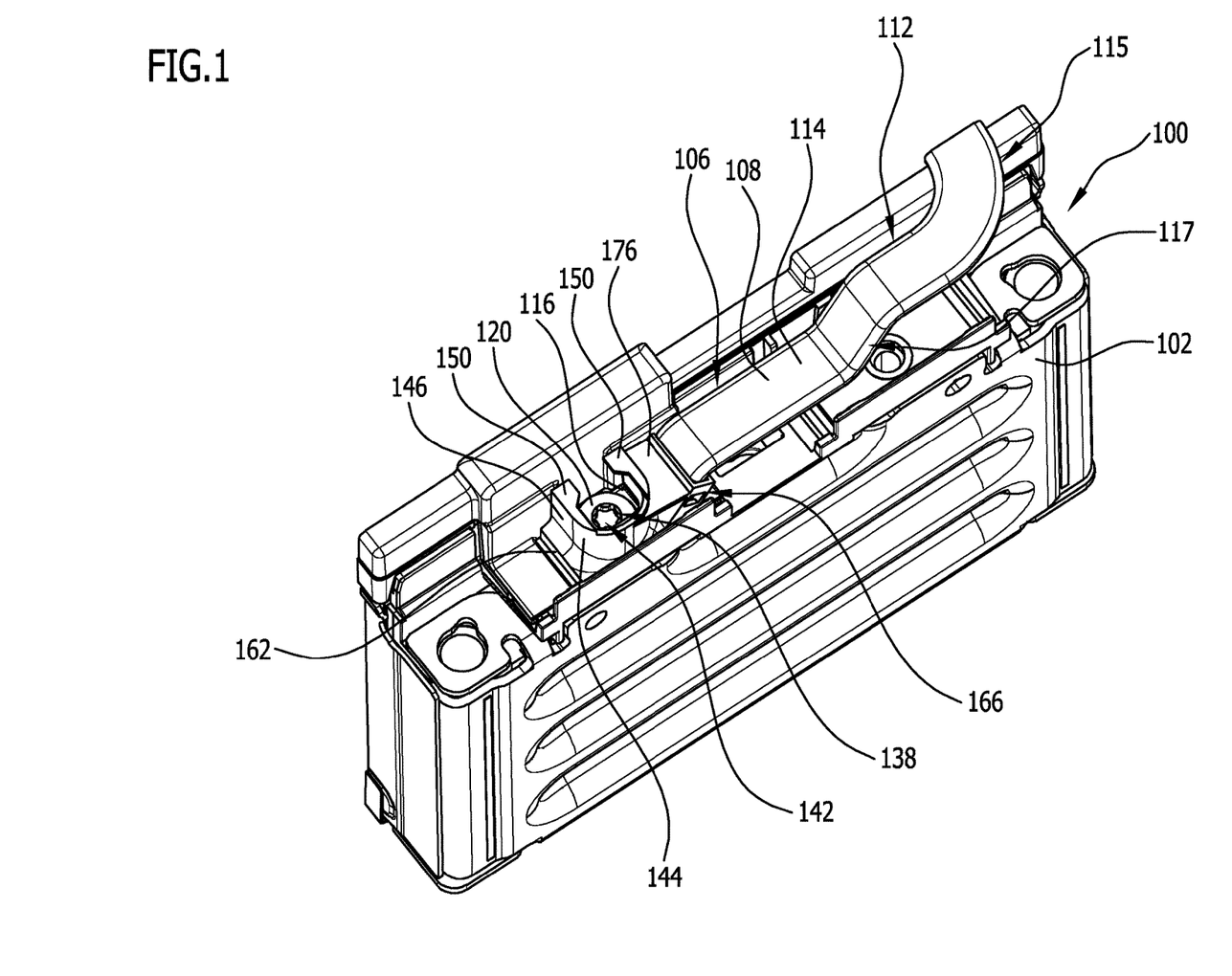
FIG. 1 shows a perspective depiction of a region of a battery module and a module connector arranged on a contact element of the battery module.

As can be seen in FIGS. 1 to 3, the connecting portion 112 of the connecting conductor 108 may be provided with one or more bends 115. The bend angle of each bend 115 is preferably at least 90°.

In a contact region 116 of the connecting conductor 108 that electrically conductively abuts against the contact element 104 in the assembled state of the module connector 106, the connecting conductor 108 is not provided with an insulating sleeve 114.

The connecting conductor 108 may be provided with one or more angled portions 117 in order to bring the contact region 116 into the desired position relative to the contact element 104 of the battery module 100.

The contact region 116 of the connecting conductor 108 is provided with a through-opening 118 through which, in the assembled state of the module connector 106, a fastening element 120 of the module connector 106 extends.

In the graphically depicted embodiment, the fastening element 120 is configured as a fastening screw 122.

The fastening element 120 preferably comprises a head 124 and a shank 126.

The shank 126 is preferably provided with a thread 128, in particular with an external thread, which in the assembled state of the module connector 106 engages into a complementary thread 130, in particular an internal thread, of the contact element 104 of the battery module 100.

In the assembled state of the module connector 106, the head 124 of the fastening element 120 abuts with its bottom side 132, which faces toward the shank 126, preferably in substantially surface-to-surface contact against the side 134 of the contact region 116 of the connecting conductor 108 of the module connector 106 that faces away from the contact element 104 of the battery module 100.

The other side 136 of the contact region 116 that faces away from the side 134 of the contact region 116 abuts, preferably in surface-to-surface contact, against the contact element 104 of the battery module 100.

The fastening element 120 preferably has an engagement region 138 with which an assembly tool (not depicted), for example a screwdriver or a key, can be brought into engagement in order to rotate the fastening element 120 about its longitudinal axis 140 and/or in order to move the fastening element 120 axially along its longitudinal axis 140.

In particular, the engagement region 138 may comprise an engagement recess 142.

The engagement recess 142 may have, for example, a polygonal cross section taken perpendicularly to the longitudinal axis 140 of the fastening element 120.

For example, provision may be made that the engagement recess 142 is formed complementary to the tip of a Torx assembly tool or an Allen assembly tool.

A contact protection for a protected part 143 of the fastening element 120 and for the contact region 116 of the connecting conductor 108 is provided by a contact protection element 144 in the assembled state of the module connector 106.

Figure 5:
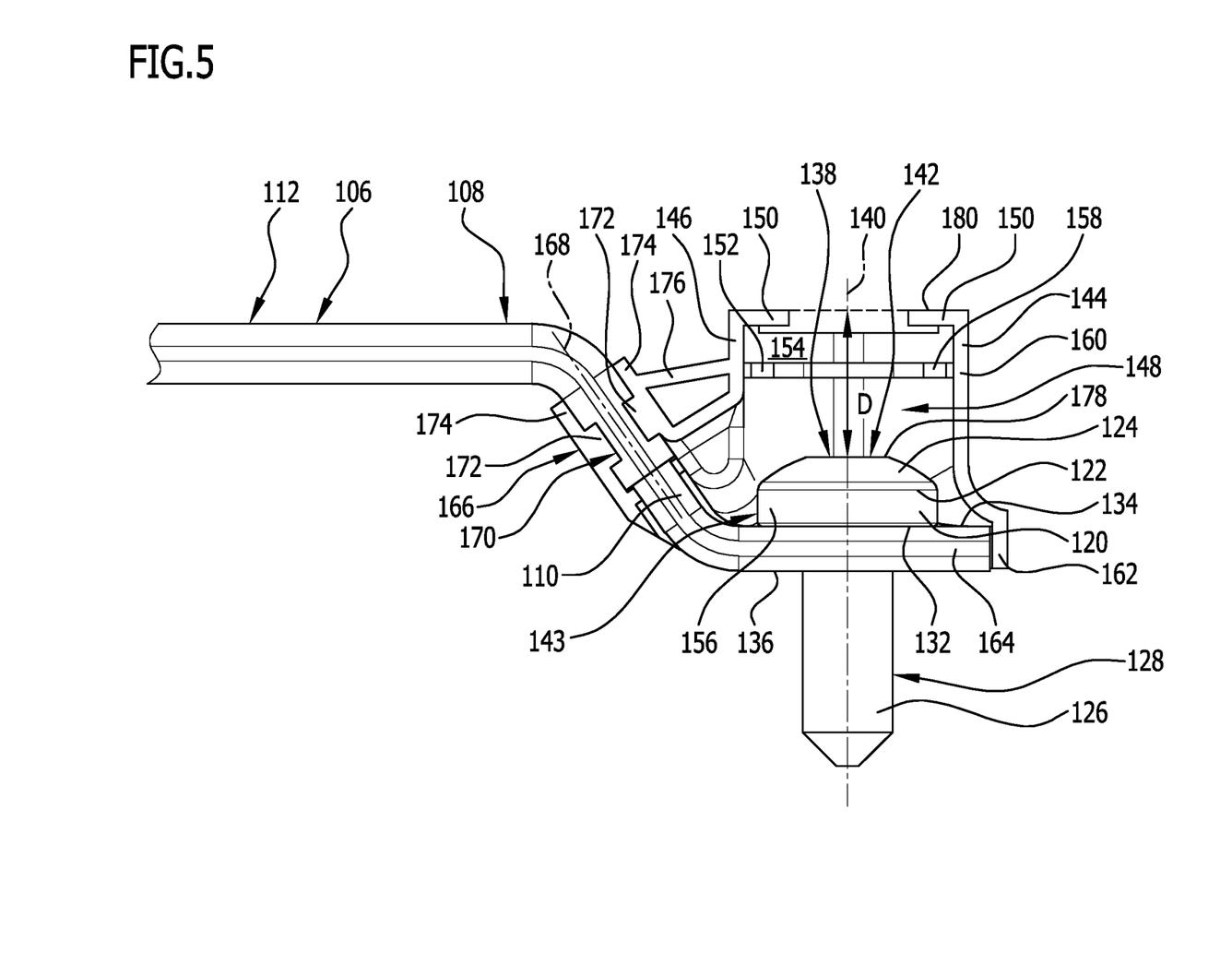
FIG. 5 shows a side view of the module connector from FIG. 4 without the battery module, the module connector comprising a connecting conductor, a contact protection element, and a fastening element for fastening a contact region of the connecting conductor to the contact element of the battery module, the fastening element being located in an assembly position.
Figure 6:
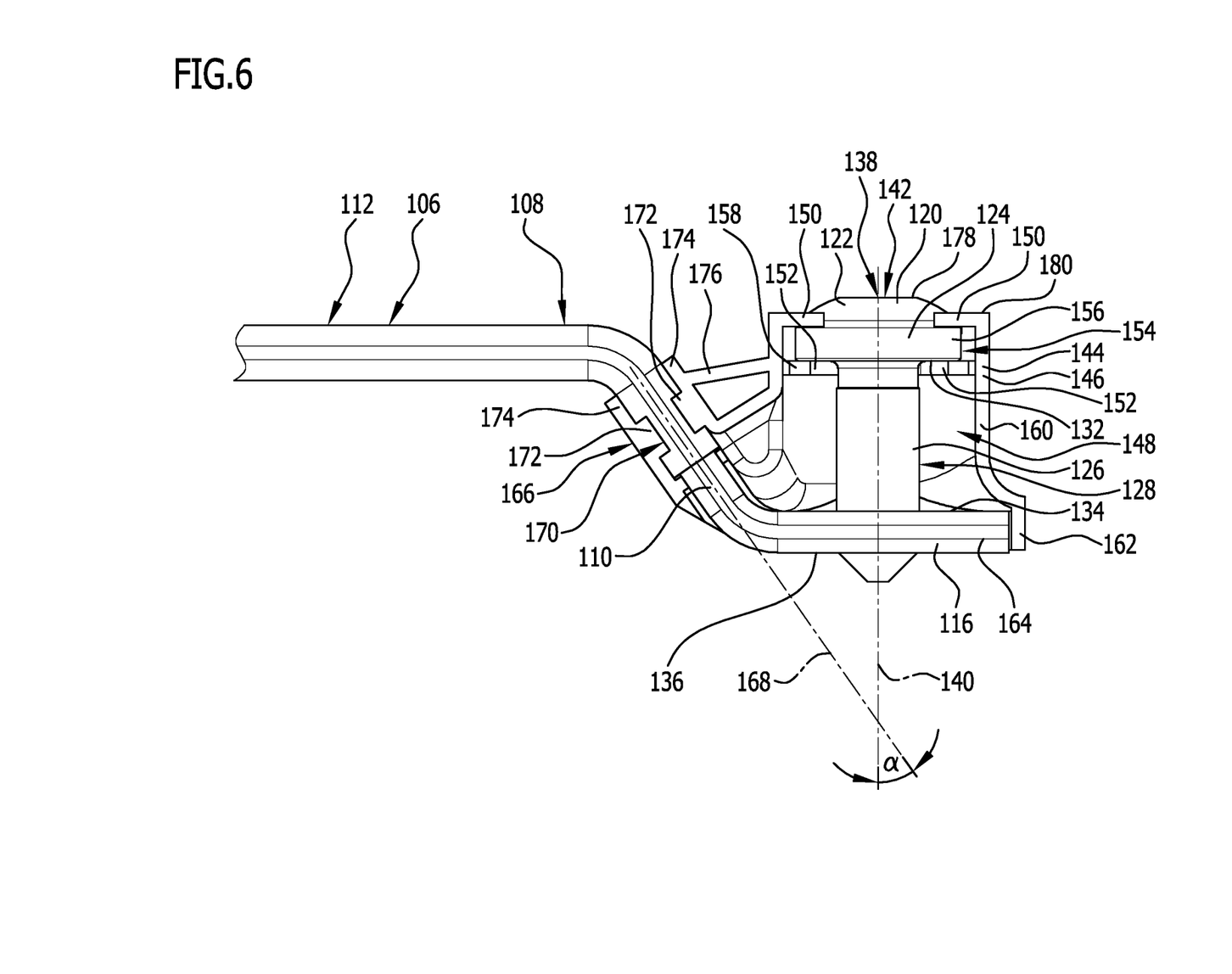
FIG. 6 shows a side view of the module connector corresponding to FIG. 5, the fastening element being located in a rest position.
Figure 7:
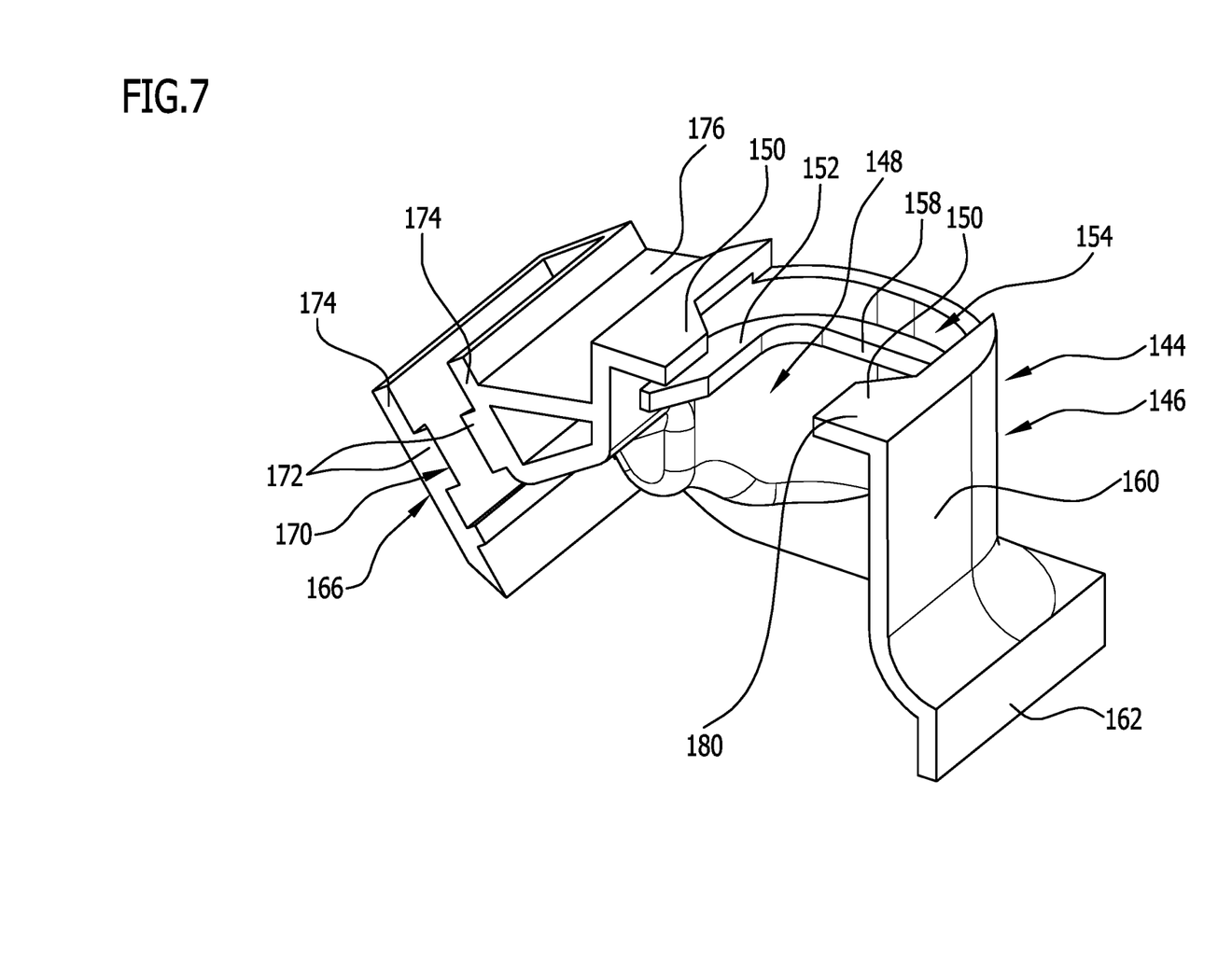
FIG. 7 shows a perspective depiction of the contact protection element of the module connector from FIGS. 5 and 6.
Figure 8:
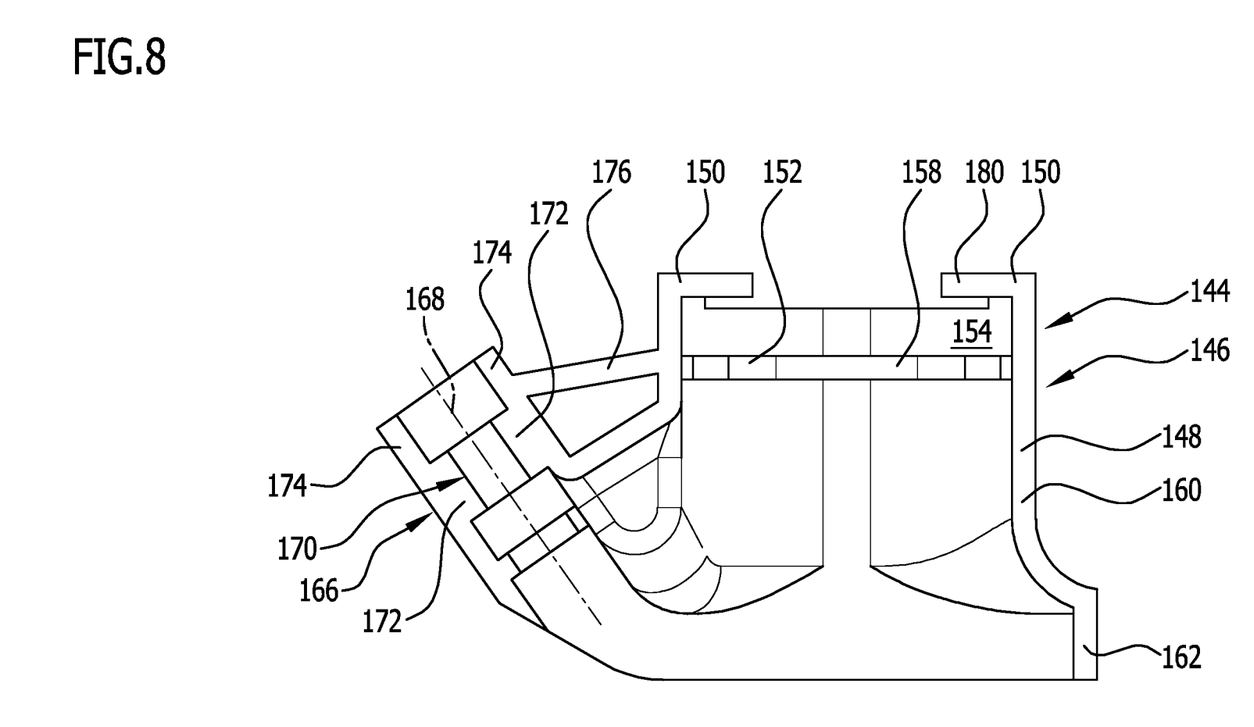
FIG. 8 shows a side view of the contact protection element of the module connector from FIG. 7.

The contact protection element 144 is depicted separately in FIGS. 7 and 8 and together with the connecting conductor 108 and the fastening element 120 in FIGS. 5 and 6.

The contact protection element 144 is configured, for example, as a contact protection cap 146 placed on the connecting conductor 108.

The contact protection element 144 comprises a receiving chamber 148 in which at least a part of the fastening element 120 is accommodated at least in the assembled state of the module connector 106.

In the graphically depicted embodiment, at least part of the fastening element 120 is also accommodated in the receiving chamber 148 in the rest position of the fastening element 120 depicted in FIG. 6.

On its end remote from the contact region 116 of the connecting conductor 108, the receiving chamber 148 of the contact protection element 144 is provided with one or more retaining elements 150, which in the rest position of the fastening element 120 cooperate with the fastening element 120, in particular with a head 124 of the fastening element 120 as the case may be, in such a way that a removal of the fastening element 120 from the receiving chamber 148 of the contact protection element 144 is prevented.

Furthermore, the contact protection element 144 comprises one or more blocking elements 152, which are arranged in the receiving chamber 148 and are spaced at a distance from the retaining element 150 or the retaining elements 150 along the longitudinal axis 140 of the fastening element 120, such that a receiving space 154 for a holding region 156 of the fastening element 120 is formed between the retaining element 150 or the retaining elements 150 on the one hand and the blocking element 152 or the blocking elements 152 on the other hand.

As can be seen in FIG. 6, in the rest position of the fastening element 120 the holding region 156, which may comprise, in particular, part of the head 124 of the fastening element 120, is held, preferably substantially without play, in the receiving space 154 between the retaining element 150 or the retaining elements 150 on the one hand and the blocking element 152 or the blocking elements 152 on the other hand.

The blocking element 152 or the blocking elements 152 may comprise, in particular, a rib 158.

The rib 158 preferably projects inwardly from a wall 160 of the receiving chamber 148 of the contact protection element 144.

The rib 158 may, in particular, be oriented substantially perpendicularly to the longitudinal axis 140 of the fastening element 120.

The contact protection element 144 preferably further comprises a covering region 162, which covers an end region 164 of the contact region 116 of the connecting conductor 108 and thus protects from contact.

The contact protection element 144 preferably further comprises an inlet channel 166 for accommodating a portion of the connecting conductor 108, which extends through the inlet channel 166 of the contact protection element 144 and is preferably connected by positive engagement, for example by latching, and/or by force fit, for example by interference fit, to the inlet channel 166 with the contact protection element 144.

As can be seen in FIG. 6, a longitudinal axis 168 of the inlet channel 166 preferably extends inclined at an acute angle α obliquely to the longitudinal axis 140 of the fastening element 120 when the fastening element 120 is located in its rest position relative to the contact protection element 144.

The inlet channel 166 preferably has a constriction 170.

As can best be seen in FIG. 7, the constriction 170 is formed by one or more, for example two, projections 172, which project from the delimiting walls 174 of the inlet channel 166 into the inlet channel 166.

The constriction 170 of the inlet channel 166 serves to connect the connecting conductor 108 extending through the inlet channel 166 to the contact protection element 144 by positive engagement and/or by force fit.

In front of and/or behind the constriction 170, the inlet channel 166 has a larger passage cross section for the connecting conductor 108 than in the region of the constriction 170 of the inlet channel 166.

In order to increase the mechanical stability of the contact protection element 144, the inlet channel 166 can be connected to one of the walls 160 of the receiving chamber 148 of the contact protection element 144 by way of a stiffening element 176, for example in the form of a stiffening rib.

The contact protection element 144, which comprises the receiving chamber 148, the inlet channel 166, optionally the covering region 162, and optionally the stiffening element 176, is preferably formed in one piece.

The contact protection element 144 may be configured, in particular, as an injection molded part.

The contact protection element 144 is of electrically insulating configuration.

The contact protection element 144 preferably comprises an electrically insulating plastic material.

In particular, provision may be made that the contact protection element 144 is made of an electrically insulating plastic material.

For example, provision may be made that the contact protection element 144 comprises a polypropylene material, a polyamide material, and/or a polybutylene terephthalate material.

Furthermore, provision may be made that the material from which the contact protection element 144 is made comprises glass fibers, in particular in a proportion by weight of at least 5% by weight, particularly preferably at least 10% by weight.

For example, provision may be made that the contact protection element 144 is made of a material that contains a polybutylene terephthalate material and glass fibers with a proportion by weight of about 10%.

The insulation resistance of the contact protection element 144 is preferably at least 100 MΩ, in particular at least 300 MΩ, particularly preferably at least 500 MΩ.

The contact protection element 144 preferably has a dielectric strength at a DC voltage of at least 2,000 V, particularly preferably at least 2,700 V.

During the production of the module connector 106, the fastening element 120 is introduced into the receiving chamber 148 of the contact protection element 144 in such a way that the holding region 156 of the fastening element 120 is held between the retaining element 150 or the retaining elements 150 on the one hand and the blocking element 152 or the blocking elements 152 on the other hand in the rest position depicted in FIG. 6.

The connecting conductor 108 is arranged on the contact protection element 144 such that a portion of the connecting conductor 108 extends through the inlet channel 166 and an end region of the shank 126 of the fastening element 120 preferably extends through the through-opening 118 of the contact region 116 of the connecting conductor 108, such that the fastening element 120 is guided on the through-opening 118 of the contact region 116.

The contact protection element 144 and the fastening element 120 are thus already captively held on the connecting conductor 108 of the module connector 106 before the assembly of the module connector 106 on the contact element 104 of the battery module 100.

It is therefore not necessary to use any additional connecting elements in the assembly of the module connector 106 on the battery module 100.

The assembly of the module connector 106 on the battery module 100 is hereby simplified and the assembly time shortened.

For assembling the module connector 106 on the contact element 104 of the battery module 100, the module connector 106 is arranged on the contact element 104 in such a way that the side 136 of the contact region 116 of the connecting conductor 108 abuts against the contact element 104 of the battery module 100 and the shank 126 of the fastening element 120 is aligned with the thread 130 of the contact element 104.

A suitable assembly tool is brought into engagement with the engagement region 138 of the fastening element 120, and the fastening element 120 is acted upon with an activating force by means of the assembly tool, by which the fastening element 120 is movable out of the rest position against the resistance of the blocking element 152 or the blocking elements 152, such that the thread 128 on the shank 126 of the fastening element 120 comes into engagement with the thread 130 of the contact element 104.

The screw-in length of the thread 128 of the fastening element 120 is thereby released for screwing to the contact element 104 of the battery module 100.

The fastening element 120 is rotated about its longitudinal axis 140 by means of the assembly tool until the fastening element 120 is screwed into the thread 130 of the contact element 104.

When the fastening element 120 is completely screwed into the thread 130 of the contact element 104, the fastening element 120 is located in the assembly position depicted in FIGS. 4 and 5.

In this assembly position, the upper end of the fastening element 120 remote from the contact region 116 of the connecting conductor 108 is spaced at a distance from an upper end 180 of the contact protection element 144 by the distance D along the longitudinal axis 140 of the fastening element 120.

The distance D is dimensioned such that when the upper end 180 of the contact protection element 144 contacts the hand or a finger of an operator, there is no risk of electrical shock when the fastening element 120 is under voltage, namely neither by contacting a component that is under voltage nor by overcoming an air gap or a creepage distance.

The protected part 143 of the fastening element 120 for which a contact protection is provided by the contact protection element 144 in the assembly position comprises, in particular, the head 124 of the fastening element 120.

The invention claimed is:

1. A module connector for electrically conductively connecting at least two battery modules, comprising a connecting conductor, which has a contact region that is arrangeable on a contact element of a battery module, wherein the module connector comprises a contact protection element, which at least partially covers the contact region of the connecting conductor, and
   a fastening element for fixing the contact region of the connecting conductor to the contact element,
   wherein the fastening element in a rest position is held on the contact protection element and is transferable from the rest position into an assembly position in which a contact protection is provided for at least a protected part of the fastening element by the contact protection element, wherein the contact protection element comprises an inlet channel for accommodating a portion of the connecting conductor.

2. The module connector in accordance with claim 1, wherein the fastening element has a head and a shank and the protected part of the fastening element comprises the head of the fastening element.

3. The module connector in accordance with claim 2, wherein the head of the fastening element in an assembled state of the module connector abuts with a bottom side of the head of the fastening element, which faces toward the shank, against a side of the contact region of the connecting conductor of the module connector that faces away from the contact element of the battery module.

4. The module connector in accordance with claim 1, wherein the fastening element in at least one of the rest position and the assembly position is captively held on the contact protection element.

5. The module connector in accordance with claim 1, wherein the contact protection element comprises a blocking element, which blocks a transfer of the fastening element from the rest position into the assembly position.

6. The module connector in accordance with claim 5, wherein the contact protection element comprises a retaining element, which prevents a removal of the fastening element from the contact protection element in the rest position of the fastening element.

7. The module connector in accordance with claim 6, wherein the fastening element comprises a holding region, which in the rest position of the fastening element is held between the blocking element and the retaining element.

8. The module connector in accordance with claim 5, wherein the fastening element has an engagement region with which an assembly tool can be brought into engagement in order to move the fastening element out of the rest position by being acted upon with an activating force.

9. The module connector in accordance with claim 5, wherein the blocking element comprises at least one rib.

10. The module connector in accordance with claim 1, wherein the connecting conductor comprises an insulating sleeve and the inlet channel has a constriction.

11. The module connector in accordance with claim 1, wherein a longitudinal axis of the inlet channel runs obliquely to a longitudinal axis of the fastening element when the fastening element is arranged in its rest position.

12. The module connector in accordance with claim 1, wherein the contact protection element is captively held on the connecting conductor.

13. The module connector in accordance with claim 1, wherein the contact protection element has a through-recess through which a part of an assembly tool can extend from an outside space of the contact protection element into an inside space of the contact protection element.

14. The module connector in accordance with claim 1, wherein the contact protection element is configured as an injection molded part.

15. The module connector in accordance with claim 1, wherein the connecting conductor comprises a flat conductor.

16. A method for electrically conductively connecting a module connector to a contact element of a battery module, wherein the module connector comprises a connecting conductor, a contact protection element, and a fastening element, and wherein the method comprises the following:
    positioning a contact region of the connecting conductor on which the contact protection element is arranged on the contact element of the battery module;
    transferring the fastening element held in a rest position on the contact protection element from the rest position into an assembly position in which the fastening element is in engagement with the contact element of the battery module and a contact protection is provided at least for a protected part of the fastening element by the contact protection element; wherein the contact protection element comprises an inlet channel for accommodating a portion of the connecting conductor.

17. A module connector for electrically conductively connecting at least two battery modules, comprising a connecting conductor, which has a contact region that is arrangeable on a contact element of a battery module, wherein the module connector comprises a contact protection element, which at least partially covers the contact region of the connecting conductor, and
    a fastening element for fixing the contact region of the connecting conductor to the contact element,
    wherein the fastening element in a rest position is held on the contact protection element and is transferable from the rest position into an assembly position in which a contact protection is provided for at least a protected part of the fastening element by the contact protection element,
    wherein the contact protection element comprises a blocking element, which blocks a transfer of the fastening element from the rest position into the assembly position.

18. A method for electrically conductively connecting a module connector to a contact element of a battery module, wherein the module connector comprises a connecting conductor, a contact protection element, and a fastening element, and wherein the method comprises the following:
    positioning a contact region of the connecting conductor on which the contact protection element is arranged on the contact element of the battery module;
    transferring the fastening element held in a rest position on the contact protection element from the rest position into an assembly position in which the fastening element is in engagement with the contact element of the battery module and a contact protection is provided at least for a protected part of the fastening element by the contact protection element; wherein the contact protection element comprises a blocking element, which blocks a transfer of the fastening element from the rest position into the assembly position.

* * * * *